US008281069B2

(12) United States Patent
van der Goot et al.

(10) Patent No.: US 8,281,069 B2
(45) Date of Patent: Oct. 2, 2012

(54) DISTRIBUTED DATA STORAGE SYSTEM USING LOCAL COPY OPERATIONS FOR RAID-1 VOLUMES

(75) Inventors: Roel van der Goot, Edmonton (CA); Nathan Bullock, Edmonton (CA)

(73) Assignee: EMC Corporation, Hopkinton, MA (US)

( * ) Notice: Subject to any disclaimer, the term of this patent is extended or adjusted under 35 U.S.C. 154(b) by 560 days.

(21) Appl. No.: 12/494,515

(22) Filed: Jun. 30, 2009

(65) Prior Publication Data

US 2010/0332748 A1  Dec. 30, 2010

(51) Int. Cl.
*G06F 12/00* (2006.01)
*G06F 13/00* (2006.01)
*G06F 13/28* (2006.01)
*G06F 7/00* (2006.01)
*G06F 17/00* (2006.01)
*G06F 11/00* (2006.01)

(52) U.S. Cl. . 711/114; 707/652; 707/655; 711/E12.103; 714/6.1; 714/E11.108

(58) Field of Classification Search .................. 711/114
See application file for complete search history.

(56) References Cited

U.S. PATENT DOCUMENTS

| | | | |
|---|---|---|---|
| 6,253,295 B1 | 6/2001 | Beal et al. | |
| 6,978,282 B1 * | 12/2005 | Dings et al. | 707/610 |
| 7,203,732 B2 * | 4/2007 | McCabe et al. | 709/217 |
| 2002/0078296 A1 * | 6/2002 | Nakamura et al. | 711/114 |
| 2006/0277380 A1 | 12/2006 | Sicola | |
| 2008/0086611 A1 | 4/2008 | Fujibayashi | |
| 2009/0083483 A1 * | 3/2009 | Balakrishnan et al. | 711/114 |

* cited by examiner

*Primary Examiner* — Sanjiv Shah
*Assistant Examiner* — Craig Goldschmidt
(74) *Attorney, Agent, or Firm* — BainwoodHuang

(57) ABSTRACT

In a distributed RAID-1 (DR1) copy operation, operation of source and target DR1 volumes is first converted to a local-copy operating mode in which the distributed copy operation is converted into a set of local copy operations. Each t is performed at a respective location of the disks of the DR1 volumes and involves copying data of the source DR1 from a first disk to a second disk via a local second communication channel of relatively high bandwidth. Following conversion, the local copy operations are performed at the locations. Upon completion of the local copy operations, storage operations to the source and target DR1 volumes are temporarily suspended, operation of the source and target DR1 volumes is converted back to the normal operating mode, and storage operations to the source and target DR1 volumes are resumed.

20 Claims, 5 Drawing Sheets

DISTRIBUTED DATA STORAGE SYSTEM USING LOCAL COPY OPERATIONS FOR RAID-1 VOLUMES

BACKGROUND

The invention is related to the field of data storage systems.

In data storage systems, the implementation of disk mirroring or Redundant Array of Independent Disks (RAID level 1 or RAID-1) on sets of disks is well known. In this configuration, a set of data is stored identically on two or more disks of a RAID-1 volume. A read operation is satisfied from one of the disks. A write operation involves writing the data to all of the disks. In the event of a disk failure, subsequent reads can be performed from a disk other than the failed disk. The failed disk can also be rebuilt by copying the entirety of the stored data from one of the other disks; thus, the availability of the data storage system is enhanced when RAID-1 is used.

RAID-1 is often used within a fairly tightly-coupled set of disks, such as disks within the same storage-area network (SAN) which share a common high-speed storage interconnection scheme. However, RAID-1 has also been implemented in a "distributed" fashion, namely across a set of disks which are separated geographically and are interconnected by a general data network rather than a specialized storage interconnection. Such a system requires relatively expensive long-haul communication channels which have limited bandwidth and increased latency compared to local-area, storage-oriented communication channels.

In storage systems, there is often a need to perform copy operations having a "bulk" nature, as opposed to more limited, discrete copying operations which involve the manipulation of data files or records by applications software. Examples of copy operations having a bulk nature include "data migration," "point-in-time copy," and "backup" operations. Data migration involves moving most or all of the data on a selected source disk to a target disk due to retirement of the source disk or growth of the data to a size which exceeds the capacity of the source disk. In a point-in-time copy operation, most or all the data of a disk is copied to another disk for different purposes. In a backup operation, a snapshot of data is copied from a production disk to another device for use in a subsequent "restore" operation such as in the case of loss of production data or the need to roll-back the data to an earlier point in time.

In systems employing distributed RAID-1s, a copy operation involves reading data from a disk of a source RAID-1 and writing the data to all the disks of a target RAID-1. This operation requires the transfer of data on all or most of the communication channels to the various locations where the disks of the target RAID-1 are positioned. However, bulk operations may saturate the communication channels (i.e., consume most or all the limited bandwidth), thereby slowing the operation itself and interfering with other operations which utilize the channels. There is thus a need in the art for a system and method which mitigates these disadvantages.

SUMMARY

Data storage systems and methods are disclosed by which a distributed copy operation is performed among distributed RAID-1 volumes in a local fashion, which may address the shortcomings of conventional distributed copy operations.

In a first step, the operation of source and target distributed RAID-1 volumes is converted to a local-copy operating mode in which the distributed copy operation is converted into a set of local copy operations. Each local copy operation is to be performed at a respective location where disks of the source and target distributed RAID-1 volumes are located, and in each local copy operation data of the source distributed RAID-1 volume is to be copied from the source disk to the target disk in the same location via a local second communication channel of relatively high bandwidth and low latency (i.e., relative to the lower-bandwidth and higher-latency first communication channels that couple the locations together, such as long-haul channels).

After the conversion, all the local copy operations are performed at the respective locations. Since it uses the local second communication channel, each local copy operation is relatively fast and does not consume bandwidth on the first communication channel which interconnects the location with the rest of the storage system. Furthermore, these local copy operations are independent of each other providing extra data redundancy faster.

Upon completion of all the local copy operations, storage operations to the source and target distributed RAID-1 volumes are temporarily suspended, operation of the source and target distributed RAID-1 volumes is converted back to the normal operating mode, and storage operations to the source and target distributed RAID-1 volumes are resumed.

Certain specific features and alternatives of the above technique are also shown for use in more particular applications such as the aforementioned data migration and point-in-time copying operations.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

The present invention is related to the operation of "distributed" storage systems in which storage resources such as disk drives are located in multiple, typically geographically separated, locations. The invention is also related to storage systems employing RAID technology.

Figure 1:
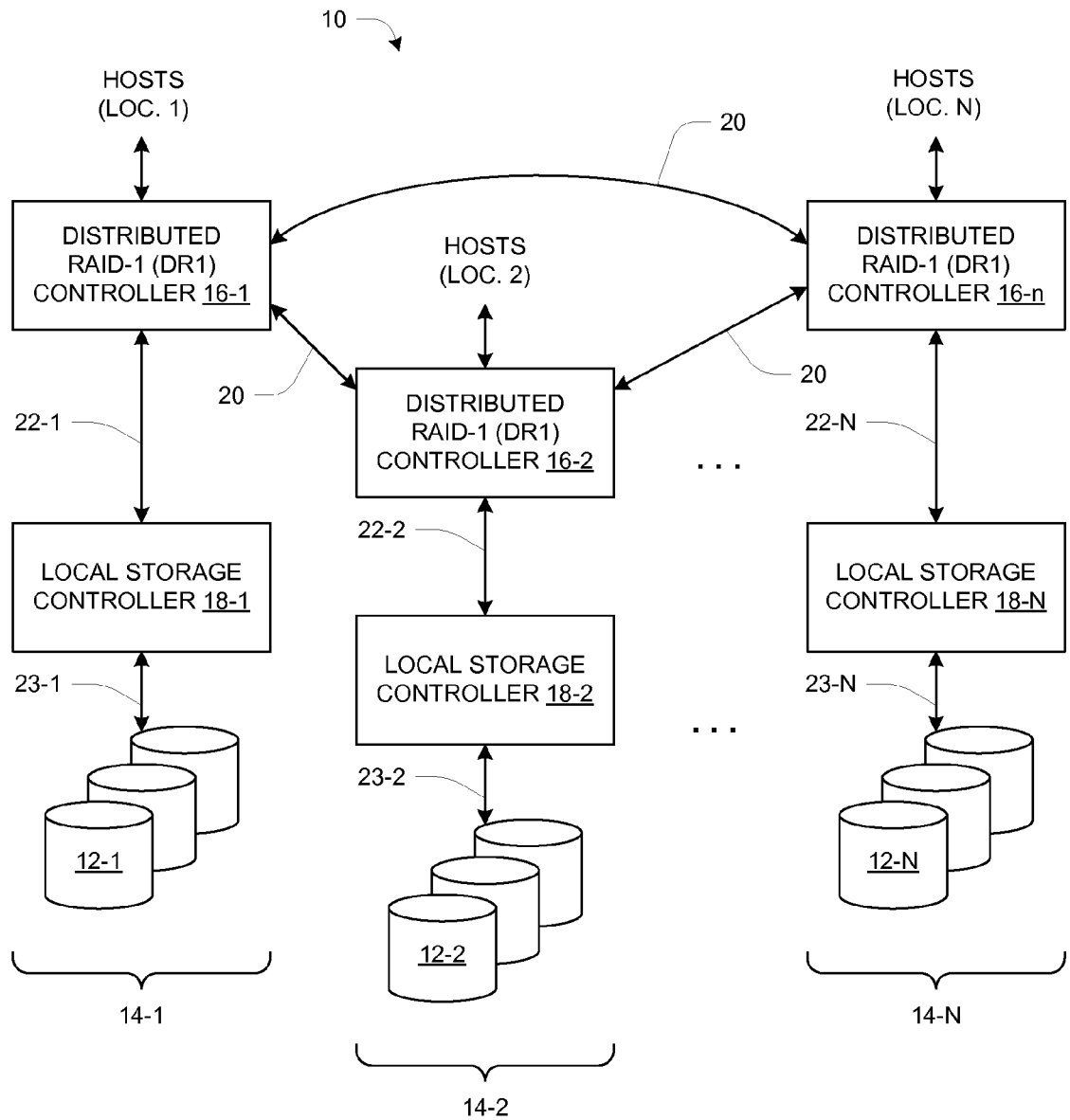
FIG. 1 is a block diagram of a distributed data storage system.

FIG. 1 shows an organization of a distributed storage system 10 in which storage resources in the form of disks 12 are distributed in multiple separate locations 14 (shown as 14-1, 14-2, ..., 14-N). In one common case, the locations 14 are geographically separated, such as different continents, countries, cities, campuses, or offices of an organization. More generally, the locations 14 may be characterized by the relative difference in available data transmission bandwidth and data transmission latency between storage controllers. Generally, there is higher data transmission bandwidth and lower data transmission latency between storage controllers within a given location 14 than between storage controllers in separate locations 14. Examples illustrating these differences are discussed below. It should be noted that there could be a hierarchy of locations 14, for example, offices forming locations 14 within campuses, campuses forming locations 14 within cities, cities forming locations 14 within countries, and so on.

The distributed storage system 10 includes a network of distributed RAID-1 (or DR1) controllers 16 coupled to local storage controllers 18 at the various locations 14. Each local storage controller 18 controls operation of the disks 12 at the same location (i.e., local storage controller 18-1 controls operations of disks 12-1, local storage controller 18-2 controls operations of disks 12-2, etc.). The DR1 controllers 16 are coupled to each other by first communication channels 20, and at each location 14 the DR1 controller 16 is coupled to the local storage controller 18 by respective second communication channels 22 (e.g., 22-1 at location 14-1, etc.). Also at each location 14, the local storage controller 18 and disks 12 are coupled together by a respective third communication channel 23 (e.g., 23-1 at location 14-1, etc.). The DR1 controllers 16 may be located at one or more of the locations 14, and additional DR1 controllers 16 may reside in other locations apart from the locations 14. Additionally, it is not necessary for each pair of DR1 controllers 16 to be directly connected together by a first communication channel 20. In some embodiments two DR1 controllers 16 may communicate through a third DR1 controller 16 and respective first communication channels 20 for example.

Examples of the first communication channels 20 are T3 and T5 links with bandwidths of 44.7 MB/s and 400 MB/s, respectively. Examples of the second and third communication channels 22, 23 are Fibrechannel, Infiniband, and TCP/IP. Current top bandwidths for these protocols are 8 Gb/s, 40 Gb/s, and 10 Gb/s, respectively. It should be noted that the bandwidths available for both long-haul and local data communications are changing constantly. It should also be noted that within some/all locations 14 the local network may be switched, resulting in multiple cables that can be used concurrently, increasing the total available bandwidth accordingly.

The DR1 controllers 16 use the disks 12 to form distributed RAID-1 logical disks that are presented to external storage clients for storing and retrieving data. As known in the art, RAID-1 involves the use of multiple disks (physical or logical) all storing identical data, such that upon failure of one disk, the data can still be obtained from another disk. In a distributed RAID-1 or DR1, the disks that are used to make up a DR1 disk or volume are distributed across multiple locations rather than being located together.

From a hardware perspective, the distributed RAID-1 controllers 16 and local storage controllers 18 may be implemented as specialized platforms for storage-related processing including high-bandwidth transfer of storage data among storage-oriented interfaces (e.g., Fibrechannel, Infiniband or TCP/IP storage buses). The overall hardware architecture may include a storage processor with memory, a plurality of storage-oriented interface circuits, and one or more high-bandwidth internal data transfer buses. The controllers 16, 18 may also have multiple sets of such processing elements configured in a redundant fashion for high availability. Additionally, although only one DR1 controller 16 and local storage controller 18 is shown at each location 14, in general there may be multiple such controllers 16, 18 at each location 14. High-speed data switches may be used to route storage commands and data both within each location 14 as well as between locations 14, as generally known in the art.

Figure 2:
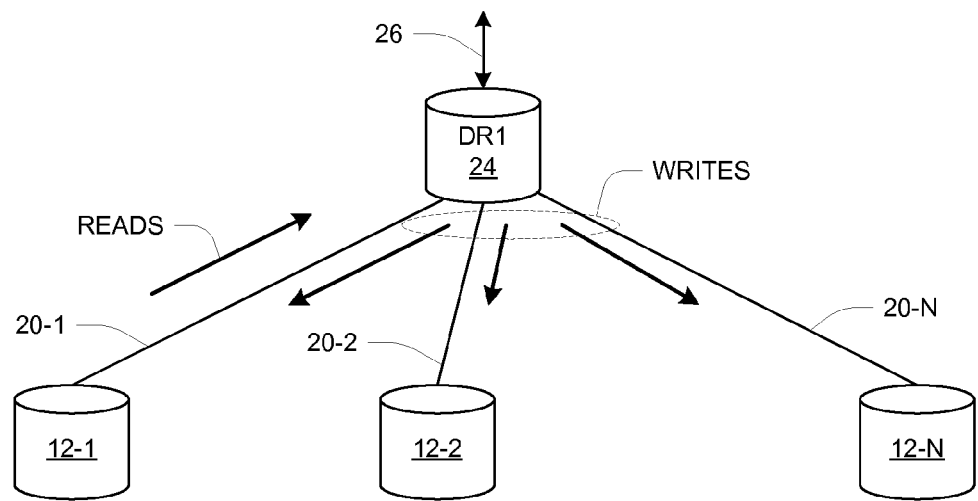
FIG. 2 is a schematic block diagram of a distributed RAID-1 volume or a distributed RAID-1 disk.

FIG. 2 illustrates the structure and operation of a DR1. In FIG. 2, the DR1 controllers 16 and local storage controllers 18 are omitted for clarity, but it will be understood that each of these items controls a corresponding disk in the scheme of FIG. 2. A DR1 disk 24 is a logical disk created and operated by the DR1 controllers 16 using underlying disks 12-1, 12-2, ... as shown, where the numerical suffixes correspond to the different locations 14 as in FIG. 1. The DR1 disk 24 has a port 26 at which client storage requests are received. To process a read request from a client, the data is normally obtained from any disk 12 using the respective first communication channel 20 and then transferred to the requesting client via the port 26. To process a write request, the data from the client is written simultaneously to all the underlying disks 12-1, 12-2, ... via the respective first communication channels 20. If a disk 12 fails, it will normally be replaced, and the data is re-built by copying from one or more non-failed disks 12.

Figure 3:
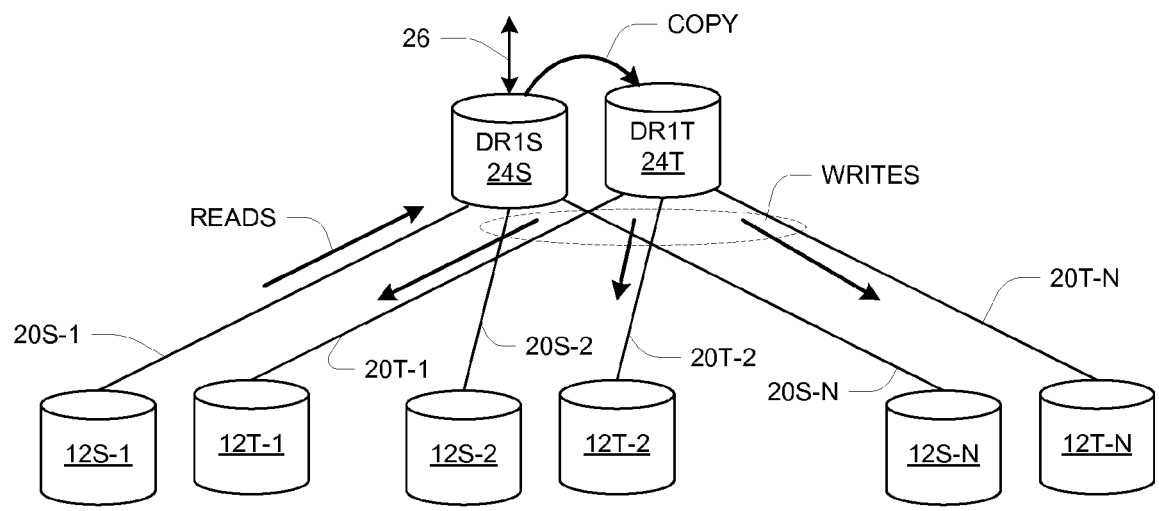
FIG. 3 is a schematic block diagram of a pair of distributed RAID-1 volumes between which a copy operation is to be performed.

FIG. 3 illustrates a configuration in which there are two separate DR1s, identified as a source DR1 (DR1S) 24S and target DR1 (DR1T) 24T. It is desired to copy a set of data from the source DR1 24S to the target DR1 24T. In particular, it is assumed that this copy operation has a "bulk" nature, i.e., it is a copy of all or a large portion of the data stored on the source DR1 24S. Examples of such copy operations include a data migration operation and a point-in-time copy operation as discussed below.

If the copy operation is performed using the normal read and write operations of the DR1s 24, it will include (1) a read requiring a transfer of data from one of the source disks 12S-1, 12S-2, ... across the respective first communication channel 20S-1, 20S-2, ..., and (2) a write requiring transfers of the data read from one of the source disks 12S-1, 12S-2, ... to all of the target disks 12T-1, 12T-2, ..., across all the respective first communication channels 20T-1, 20T-2, .... These data transfers may partly or wholly saturate the relatively low available bandwidth of the first communication channels 20T for the duration of the copy operation. The copy operation itself may be slow and interfere with other data traffic or operations being performed by the system 10.

Figure 4A:
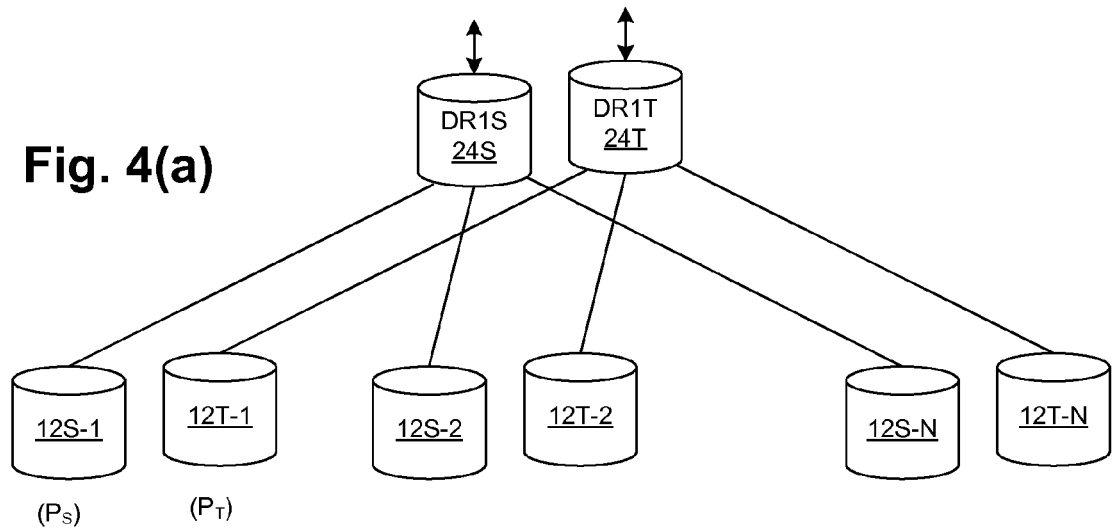
FIGS. 4(a) and 4(b) are schematic block diagrams depicting a general method of carrying out a copy operation between two distributed RAID-1 volumes using local copy operations.

FIG. 4 illustrates a method for performing a copy operation between two DR1s which may achieve better performance and minimize use of the bandwidth of the first communication channels 20. FIG. 4(a) shows an initial condition at the time of initiating the copy operation. The two DR1s 24S and 24T are both operating in normal operating modes using their respective underlying disks 12. For each DR1 24, reads and writes are performed as described above with reference to FIG. 2 (i.e., for each DR1, data is read from a respective disk 12 over a respective first communication channel 20, and data is written to all respective disks 12 over respective first communication channels 20). In this normal operating mode, each local storage controller 18 performs reads and writes to the local disks 12 on behalf of the RAID controller 16 which operates each DR1 24S and 24T independently. Consequently, at a given location 14, the source disk 12S of the source DR1 24S and target disk 12T of the target DR1 24T operate independently and each transfers data to and from only a respective DR1 controller 16. In this mode, a copy operation requires that all data be transferred through the DR1 controllers 16 and the first communication channels 20 as described above.

Figure 4B:
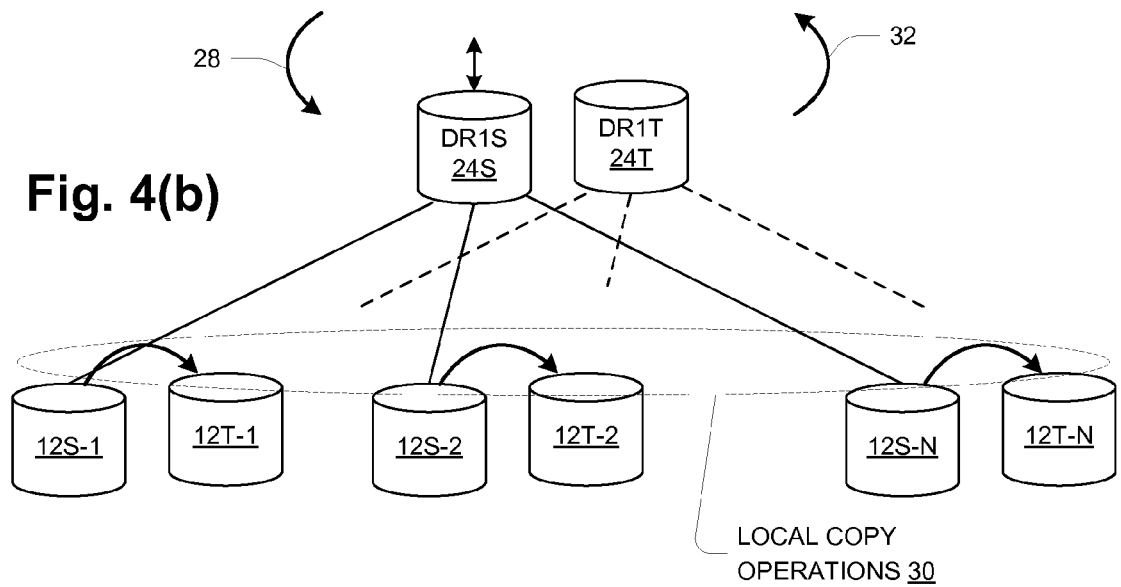

Upon initiation of the copy operation, the system makes a transition 28 to a "local-copy" operating mode which is shown in FIG. 4(b). In this mode, the local storage controllers 18 perform a set of local copy operations 30 in which each local storage controller 18 copies data from a source disk 12S of the source DR1 24S directly to a co-located target disk 12T of the target DR1 24T via the respective third communication channel 23 (see FIG. 1). As explained above, the third communication channels 23 are separate from and of higher bandwidth and lower latency than the first communication channels 20. Thus, the set of local copy operations 30 is performed faster than the above-described copy operation involving use of the first communication channels 20, and avoids interfering with other data traffic carried on the first communication channels 20. This local-copy operation of the local storage controllers 18 is performed in response to a command or direction received from the DR1 controllers 16 as part of the transition 28. In case the source DR1 24S and the target DR1 24T do not span identical locations 14, the transformation only applies to locations 14 where source DR1 24S contains a disk 12S and target DR1 24T contains a disk 12T. In any other locations 14, a distributed copy operation will have to be performed.

From a functional perspective, the set of local copy operations 30 obtains the same result as the normal DR1 copy discussed above—the data from all the disks 12S of the source DR1 24S is now identically present on all the disks 12T of the target DR1 24T. Upon completion of all the local copy operations 30, the system makes a second transition 32 to revert to the normal operating mode of FIG. 4(a). The second transition 32 may be preceded by suspending storage operations to the source and target DR1s 24S and 24T, and resuming storage operations after the transition 32 is complete.

The copy operation of FIG. 4 may be useful in specific applications including, for example, data migration and "point-in-time" copy operations. Data migration arises in several contexts, including for example, an upgrading of storage devices. If one or more disks 12 of a DR1 are to be retired (either with or without replacement), the data stored on the DR1 may need to be moved to another DR1 in the system. Point-in-time copying involves capturing a snapshot of data on a source DR1 by copying to a target DR1, after which the source DR1 may remain in production and the data may continue to change as a result of normal storage operations. The snapshot stored on the target DR1 may be used for various purposes, such as for a later restore operation if the source DR1 fails, or for a regulatory or administrative function that requires data from a well-defined point in time.

Regarding the point-in-time copy operation, the process is substantially as described above with reference to FIG. 4. In this case, the local copy operations 30 are individual point-in-time copy operations performed at the local level, with each involving a respective snapshot of data from a local disk 12S corresponding to a snapshot of data of the source RAID-1 24S. It should be noted that point-in-time copy operations can be carried out in multiple ways. In one technique, a RAID-1 having two constituent disks 12 is built by performing a data migration from one disk 12 (source) to another disk 12. Then the RAID-1 is split into separate volumes, which are the original (source) volume as well as the new point-in-time copy of the original. This approach may work best if there is some advance knowledge that a point-in-time copy is needed.

In another approach, a new volume is created but the data from the source volume is not copied in one operation, but rather over time. As writes occur which modify the data on the source volume, the original data is copied over to the new (target) volume. Any reads of the new volume for data that has not yet been copied over are re-directed to the source volume. This process continues until all the required original data has been copied to the new volume. In a modification of this approach, there may also be a process for pushing the original data from the source volume to the target volume, while still performing the re-direction of reads as may be required for coherent access. The distributed copy operation as described herein can support all these different approaches to point-in-time copying.

Figure 5A:
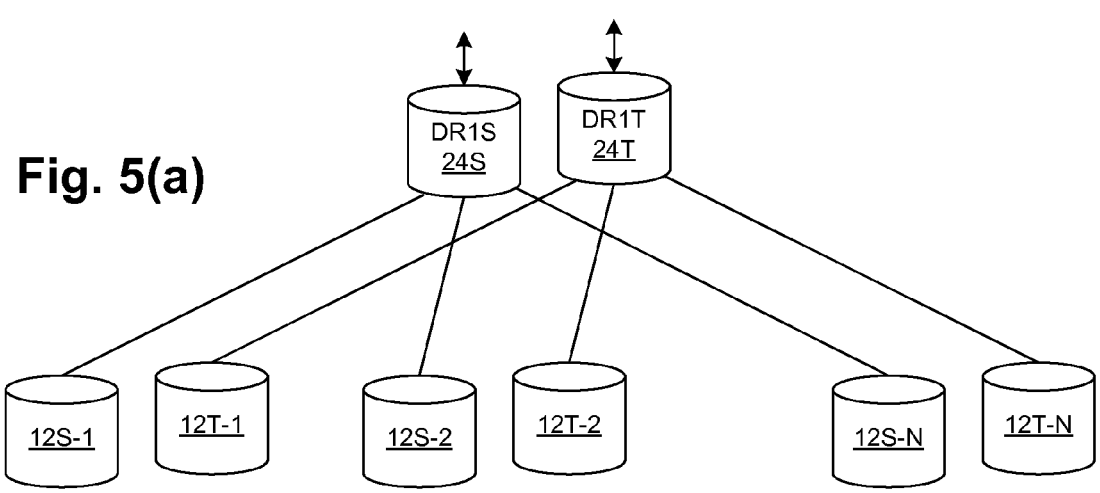
FIGS. 5(a) and 5(b) are schematic block diagrams depicting a method similar to that of FIGS. 4(a) and 4(b) and involving use of an intermediate RAID-1 for data migration.
Figure 5B:
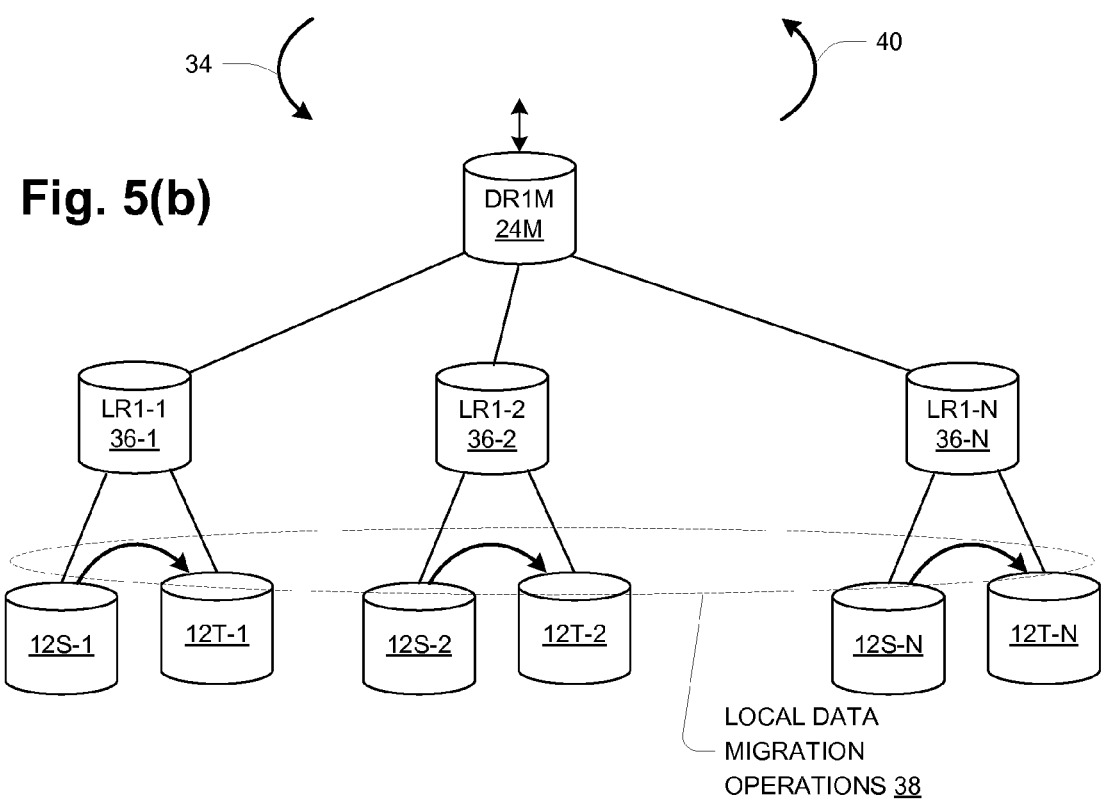

FIGS. 5(a) and 5(b) illustrate an example of a data migration operation. FIG. 5(a) shows the initial configuration as in the general case described above with reference to FIG. 4(a). The system makes a transition 34 to an "intermediate" RAID configuration shown in FIG. 5(b) in which a single intermediate distributed RAID-1 (DR1M) 24M is created. This transition is termed a "merging conversion". The intermediate distributed RAID-1 24M utilizes N "local" RAID-1s (LR1s) 36-1, 26-2, . . . as shown, each of which in turn utilizes the local source disk 12S and local target disk 12T of the original source and target DR1s 24S, 24T. In one embodiment, the local RAID-1s 36 are realized by the local storage controllers 18 (FIG. 1). The intermediate configuration of FIG. 5(b) is a special case of the local-copy mode discussed above. Once configured in this manner, the system engages in a set of local data migration operations 38, each one being carried out at a given location 14 (FIG. 1) and migrating the data locally from the local source disk 12S to the local target disk 12T using respective third communication channels 23 (FIG. 1). Upon completion of these local data migration operations 38, the system makes another transition 40 back to the normal operating mode as shown in FIG. 5(a). The transition 40 is termed a "de-merging conversion." Locations 14 containing only disks 12T of the target DR1 24T but no disks 12S of the source DR1 S 24S do not partake in the merging and de-merging conversions. Hence a distributed data migration operation will still have to take place for those disks 12T.

Figure 6:
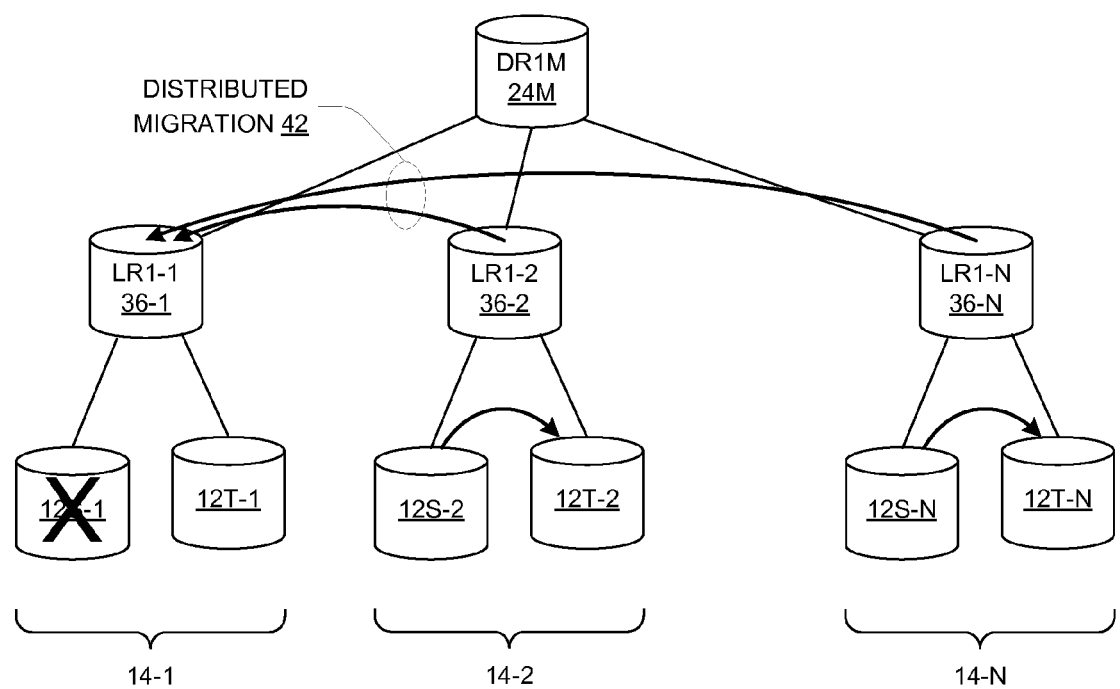
FIG. 6 is a schematic block diagram illustrating a recovery distributed copy operation which is used when a source disk is unavailable for the local copy operation in the process of FIGS. 5(a) and 5(b).

FIG. 6 shows a modified operation of the scheme of FIG. 5 in which a local source disk 12 (e.g., 12S-1 as shown) fails during the data migration. The data migration for the location 14-1 reverts to a distributed rebuild of the affected LR1, by the use of a data migration 42 from one or more of the other local RAID-1s 36. After this distributed rebuild is completed along with the non-affected local data migrations 38 (FIG. 5(b)), the system makes the transition 40 back to the normal operation mode. Thus, the distributed copy operation remains available for use as a back-up or recovery measure in case one or more local copy operations 30 cannot be carried out. The use of such a "recovery" distributed copy operation for recovery purposes is available in any of the above-described configurations, although specific details of the operation may vary.

While each RAID or storage controller (e.g., 16, 18) is described above as a single controller, alternative embodiments may utilize multiple controllers at a given level of the hierarchy. For example, the source and target DR1s 24S, 24T may be realized by separate DR1 controllers which may or may not be co-located. Such partitioning of functions among multiple controllers may also occur within each location 14. Other modifications of and alternatives to various specifics described herein may be possible within the scope of the appended claims below.

What is claimed is:

1. A method of copying data from a source distributed RAID-1 volume to a target distributed RAID-1 volume of a data storage system, the source distributed RAID-1 volume utilizing a set of first disks distributed among a plurality of locations, the target distributed RAID-1 volume utilizing a set of second disks also distributed among the plurality of locations, such that each of the locations includes one of the first disks and one of the second disks, the plurality of locations being connected to each other by a set of first communication channels of a first bandwidth, the first disk and second disk at each location being coupled together by a respective second communication channel of a second bandwidth greater than the first bandwidth, the method comprising:

a normal operating mode in which distributed copy operations from the source distributed RAID-1 volume to the target distributed RAID-1 volume are performed by reading data from a respective first disk of the source distributed RAID-1 volume over a respective first communication channel, then writing the data to each of the second disks of the target distributed RAID-1 volume over the respective first communication channels;

a local-copy operating mode in which distributed copy operations from the source distributed RAID-1 volume to the target distributed RAID-1 volume are performed by converting the distributed copy operations to a set of local copy operations, each local copy operation being performed at a respective one of the locations by copying data of the source distributed RAID-1 volume from the first disk of the location to the second disk of the location via the respective second communication channel; and a bulk copy operation including:
1) converting operation of the source and target distributed RAID-1 volumes from the normal operating mode to the local-copy operating mode;
2) performing one or more distributed copy operations in the local-copy operating mode;
3) suspending storage operations to the source and target distributed RAID-1 volumes;
4) converting operation of the source and target distributed RAID-1 volumes from the local-copy operating mode to the normal operating mode; and
5) resuming storage operations to the source and target distributed RAID-1 volumes.

2. The method of claim 1, wherein:
the copying is part of a data migration operation carried out to make the copied data accessible from the target distributed RAID-1 volume after the data migration operation is complete;
converting operation of the source and target distributed RAID-1 volumes from the normal operating mode to the local-copy operating mode includes a merging conversion of the source and target distributed RAID-1 volumes into an intermediate distributed RAID-1 volume utilizing a set of local RAID-1 volumes, each local RAID-1 volume utilizing the first and second disks at a respective one of the locations;
each local copy operation is a local data migration operation performed with respect to the respective local RAID-1 volume of the intermediate distributed RAID-1 volume; and
converting operation of the source and target distributed RAID-1 volumes from the local-copy operating mode to the normal operating mode includes a de-merging conversion of the intermediate distributed RAID-1 volume back into the source and target distributed RAID-1 volumes utilizing the sets of first and second disks as prior to the merging conversion.

3. The method of claim 2, further including:
if the first disk at a respective given location is available for obtaining data of the source distributed RAID-1 volume stored thereon, then performing the local data migration for a given local RAID-1 volume, and
otherwise, if the first disk at the respective given location is not available for obtaining the data of the source distributed RAID-1 volume stored thereon, then performing a recovery distributed copy operation copying data to the second disk at the respective given location from a respective first disk at another location over respective ones of the first communication channels.

4. The method of claim 1, wherein:
the copying is part of a point-in-time copy operation by which a snapshot of data on the source distributed RAID-1 volume is copied to the target distributed RAID-1 volume to be available from the target distributed RAID-1 volume after the point-in-time copy operation is complete, the snapshot of data including corresponding snapshots of data stored on the firsts disks;
the method further includes, prior to performing the local copy operations, making the source distributed RAID-1 volume unavailable for storage operations other than the point-in-time copy operation; and
each local copy operation is a local point-in-time copy operation by which the respective snapshot of data on the first disk is copied to the second disk of the location to be available from the second disk of the location.

5. The method of claim 1, further including:
if the first disk at the given location is available for obtaining data of the source distributed RAID-1 volume stored thereon, then performing the local copy operation at a given location, and
otherwise, if the first disk at the given location is not available for obtaining the data of the source distributed RAID-1 volume stored thereon, then performing a recovery distributed copy operation copying data to the second disk at the given location from a respective first disk at another location over respective ones of the first communication channels.

6. A data storage system, comprising:
a set of local storage systems distributed across a plurality of locations, each local storage system including a plurality of disks and a local storage controller; and
a distributed RAID-1 controller being operative in conjunction with the local storage controllers to perform a method of copying data from a source distributed RAID-1 volume to a target distributed RAID-1 volume of the data storage system, the source distributed RAID-1 volume utilizing a set of first disks distributed among a plurality of locations, the target distributed RAID-1 volume utilizing a set of second disks also distributed among the plurality of locations, such that each of the locations includes one of the first disks and one of the second disks, the plurality of locations being connected to each other and to the distributed RAID-1 controller by a set of first communication channels of a first bandwidth, the first disk and second disk at each location being coupled together by a respective second communication channel of a second bandwidth greater than the first bandwidth, the method performed by the distributed RAID-1 controller including:
a normal operating mode in which distributed copy operations from the source distributed RAID-1 volume to the target distributed RAID-1 volume are performed by reading data from a respective first disk of the source distributed RAID-1 volume over a respective first communication channel, then writing the data to each of the second disks of the target distributed RAID-1 volume over the respective first communication channels;

a local-copy operating mode in which distributed copy operations from the source distributed RAID-1 volume to the target distributed RAID-1 volume are performed by converting the distributed copy operations to a set of local copy operations, each local copy operation being performed at a respective one of the locations by copying data of the source distributed RAID-1 volume from the first disk of the location to the second disk of the location via the respective second communication channel; and a bulk copy operation including:
1) converting operation of the source and target distributed RAID-1 volumes from the normal operating mode to the local-copy operating mode;
2) performing one or more distributed copy operations in the local-copy operating mode;
3) suspending storage operations to the source and target distributed RAID-1 volumes;
4) converting operation of the source and target distributed RAID-1 volumes from the local-copy operating mode to the normal operating mode; and
5) resuming storage operations to the source and target distributed RAID-1 volumes.

7. The data storage system of claim 6, wherein:
the copying is part of a data migration operation carried out to make the copied data accessible from the target distributed RAID-1 volume after the data migration operation is complete;
converting operation of the source and target distributed RAID-1 volumes from the normal operating mode to the local-copy operating mode includes a merging conversion of the source and target distributed RAID-1 volumes into an intermediate distributed RAID-1 volume utilizing a set of local RAID-1 volumes, each local RAID-1 volume utilizing the first and second disks at a respective one of the locations;
each local copy operation is a local data migration operation performed with respect to the respective local RAID-1 volume of the intermediate distributed RAID-1 volume; and
converting operation of the source and target distributed RAID-1 volumes from the local-copy operating mode to the normal operating mode includes a de-merging conversion of the intermediate distributed RAID-1 volume back into the source and target distributed RAID-1 volumes utilizing the sets of first and second disks as prior to the merging conversion.

8. The data storage system of claim 7, wherein the method of the distributed copy operation further includes:
if the first disk at a respective given location is available for obtaining data of the source distributed RAID-1 volume stored thereon, then performing the local data migration for a given local RAID-1 volume, and
otherwise, if the first disk at the respective given location is not available for obtaining the data of the source distributed RAID-1 volume stored thereon, then performing a recovery distributed copy operation copying data to the second disk at the respective given location from a respective first disk at another location over respective ones of the first communication channels.

9. The data storage system of claim 6, wherein:
the copying is part of a point-in-time copy operation by which a snapshot of data on the source distributed RAID-1 volume is copied to the target distributed RAID-1 volume to be available from the target distributed RAID-1 volume after the point-in-time copy operation is complete, the snapshot of data including corresponding snapshots of data stored on the firsts disks;
the method further includes, prior to performing the local copy operations, making the source distributed RAID-1 volume unavailable for storage operations other than the point-in-time copy operation; and
each local copy operation is a local point-in-time copy operation by which the respective snapshot of data on the first disk is copied to the second disk of the location to be available from the second disk of the location.

10. The data storage system of claim 6, wherein the method of the distributed copy operation further includes:
if the first disk at the given location is available for obtaining data of the source distributed RAID-1 volume stored thereon, then performing the local copy operation at a given location, and
otherwise, if the first disk at the given location is not available for obtaining the data of the source distributed RAID-1 volume stored thereon, then performing a recovery distributed copy operation copying data to the second disk at the given location from a respective first disk at another location over respective ones of the first communication channels.

11. A distributed RAID-1 storage controller, comprising:
one or more interface circuits to couple the distributed RAID-1 storage controller to a plurality of local storage systems; and
a storage processor operative in conjunction with local storage controllers of the local storage systems to perform a method of copying data from a source distributed RAID-1 volume to a target distributed RAID-1 volume of the data storage system, the source distributed RAID-1 volume utilizing a set of first disks distributed among a plurality of locations, the target distributed RAID-1 volume utilizing a set of second disks also distributed among the plurality of locations, such that each of the locations includes one of the first disks and one of the second disks, the plurality of locations being connected to each other and to the distributed RAID-1 storage controller by a set of first communication channels of a first bandwidth, the first disk and second disk at each location being coupled together by a respective second communication channel of a second bandwidth greater than the first bandwidth, the method performed by the storage processor including:
a normal operating mode in which distributed copy operations from the source distributed RAID-1 volume to the target distributed RAID-1 volume are performed by reading data from a respective first disk of the source distributed RAID-1 volume over a respective first communication channel, then writing the data to each of the second disks of the target distributed RAID-1 volume over the respective first communication channels;
a local-copy operating mode in which distributed copy operations from the source distributed RAID-1 volume to the target distributed RAID-1 volume are performed by converting the distributed copy operations to a set of local copy operations, each local copy operation being performed at a respective one of the locations by copying data of the source distributed RAID-1 volume from the first disk of the location to the second disk of the location via the respective second communication channel; and a bulk copy operation including:
1) converting operation of the source and target distributed RAID-1 volumes from the normal operating mode to the local-copy operating mode;
2) performing one or more distributed copy operations in the local-copy operating mode;
3) suspending storage operations to the source and target distributed RAID-1 volumes;
4) converting operation of the source and target distributed RAID-1 volumes from the local-copy operating mode to the normal operating mode; and
5) resuming storage operations to the source and target distributed RAID-1 volumes.

12. The distributed RAID-1 storage controller of claim 11, wherein:

the copying is part of a data migration operation carried out to make the copied data accessible from the target distributed RAID-1 volume after the data migration operation is complete;

converting operation of the source and target distributed RAID-1 volumes from the normal operating mode to the local-copy operating mode includes a merging conversion of the source and target distributed RAID-1 volumes into an intermediate distributed RAID-1 volume utilizing a set of local RAID-1 volumes, each local RAID-1 volume utilizing the first and second disks at a respective one of the locations;

each local copy operation is a local data migration operation performed with respect to the respective local RAID-1 volume of the intermediate distributed RAID-1 volume; and converting operation of the source and target distributed RAID-1 volumes from the local-copy operating mode to the normal operating mode includes a de-merging conversion of the intermediate distributed RAID-1 volume back into the source and target distributed RAID-1 volumes utilizing the sets of first and second disks as prior to the merging conversion.

13. The distributed RAID-1 storage controller of claim 12, wherein the method of the distributed copy operation further includes:

if the first disk at a respective given location is available for obtaining data of the source distributed RAID-1 volume stored thereon, then performing a local data migration for a given local RAID-1 volume, and otherwise, if the first disk at the respective given location is not available for obtaining the data of the source distributed RAID-1 volume stored thereon, then performing a recovery distributed copy operation copying data to the second disk at the respective given location from a respective first disk at another location over respective ones of the first communication channels.

14. The distributed RAID-1 storage controller of claim 11, wherein:

the copying is part of a point-in-time copy operation by which a snapshot of data on the source distributed RAID-1 volume is copied to the target distributed RAID-1 volume to be available from the target distributed RAID-1 volume after the point-in-time copy operation is complete, the snapshot of data including corresponding snapshots of data stored on the firsts disks;

the method further includes, prior to performing the local copy operations, making the source distributed RAID-1 volume unavailable for storage operations other than the point-in-time copy operation; and each local copy operation is a local point-in-time copy operation by which the respective snapshot of data on the first disk is copied to the second disk of the location to be available from the second disk of the location.

15. The distributed RAID-1 storage controller of claim 11, wherein the method of the distributed copy operation further includes:

if the first disk at the given location is available for obtaining data of the source distributed RAID-1 volume stored thereon, then performing a local copy operation at a given location, and otherwise, if the first disk at the given location is not available for obtaining the data of the source distributed RAID-1 volume stored thereon, then performing a recovery distributed copy operation copying data to the second disk at the given location from a respective first disk at another location over respective ones of the first communication channels.

16. A storage system for use as a local storage system in a distributed storage system, the distributed storage system including a distributed RAID-1 controller and a plurality of local storage systems distributed across a set of locations, comprising:

a plurality of disks;

an interface circuit to couple the storage system to the distributed RAID-1 controller; and a storage processor operative in conjunction with the distributed RAID-1 controller to perform a local portion of a method of copying data from a source distributed RAID-1 volume to a target distributed RAID-1 volume of the data storage system, the source distributed RAID-1 volume utilizing a set of first disks distributed among a plurality of locations, the target distributed RAID-1 volume utilizing a set of second disks also distributed among the plurality of locations, such that each of the locations includes one of the first disks and one of the second disks, the plurality of locations being connected to each other and to the distributed RAID-1 controller by a set of first communication channels of a first bandwidth, the first disk and second disk at each location being coupled together by a respective second communication channel of a second bandwidth greater than the first bandwidth, the method performed by the distributed RAID-1 controller including:

a normal operating mode in which distributed copy operations from the source distributed RAID-1 volume to the target distributed RAID-1 volume are performed by reading data from a respective first disk of the source distributed RAID-1 volume over a respective first communication channel, then writing the data to each of the second disks of the target distributed RAID-1 volume over the respective first communication channels;

a local-copy operating mode in which distributed copy operations from the source distributed RAID-1 volume to the target distributed RAID-1 volume are performed by converting the distributed copy operations to a set of local copy operations, each local copy operation being performed at a respective one of the locations by copying data of the source distributed RAID-1 volume from the first disk of the location to the second disk of the location via the respective second communication channel; and a bulk copy operation including:
1) converting operation of the source and target distributed RAID-1 volumes from the normal operating mode to the local-copy operating mode;
2) performing one or more distributed copy operations in the local-copy operating mode;
3) suspending storage operations to the source and target distributed RAID-1 volumes;
4) converting operation of the source and target distributed RAID-1 volumes from the local-copy operating mode to the normal operating mode; and
5) resuming storage operations to the source and target distributed RAID-1 volumes.

17. The storage system of claim 16, wherein:
the copying is part of a data migration operation carried out to make the copied data accessible from the target distributed RAID-1 volume after the data migration operation is complete;
converting operation of the source and target distributed RAID-1 volumes from the normal operating mode to the local-copy operating mode includes a merging conversion of the source and target distributed RAID-1 volumes into an intermediate distributed RAID-1 volume utilizing a set of local RAID-1 volumes, each local RAID-1 volume utilizing the first and second disks at a respective one of the locations;
each local copy operation is a local data migration operation performed with respect to the respective local RAID-1 volume of the intermediate distributed RAID-1 volume; and
converting operation of the source and target distributed RAID-1 volumes from the local-copy operating mode to the normal operating mode includes a de-merging conversion of the intermediate distributed RAID-1 volume back into the source and target distributed RAID-1 volumes utilizing the sets of first and second disks as prior to the merging conversion.

18. The storage system of claim 17, wherein the local portion of the distributed copy operation further includes:
if the first disk at a respective given location is available for obtaining data of the source distributed RAID-1 volume stored thereon, then performing the local data migration for a given local RAID-1 volume, and
otherwise, if the first disk at the respective given location is not available for obtaining the data of the source distributed RAID-1 volume stored thereon, then performing a recovery distributed copy operation copying data to the second disk at the respective given location from a respective first disk at another location over respective ones of the first communication channels.

19. The storage system of claim 16, wherein:
the copying is part of a point-in-time copy operation by which a snapshot of data on the source distributed RAID-1 volume is copied to the target distributed RAID-1 volume to be available from the target distributed RAID-1 volume after the point-in-time copy operation is complete, the snapshot of data including corresponding snapshots of data stored on the firsts disks;
the method further includes, prior to performing the local copy operations, making the source distributed RAID-1 volume unavailable for storage operations other than the point-in-time copy operation; and
each local copy operation is a local point-in-time copy operation by which the respective snapshot of data on the first disk is copied to the second disk of the location to be available from the second disk of the location.

20. The storage system of claim 16, wherein the local portion of the distributed copy operation further includes:
if the first disk at the given location is available for obtaining data of the source distributed RAID-1 volume stored thereon, then performing the local copy operation at a given location, and
if the first disk at the given location is not available for obtaining the data of the source distributed RAID-1 volume stored thereon, then performing a recovery distributed copy operation copying data to the second disk at the given location from a respective first disk at another location over respective ones of the first communication channels.

* * * * *